(12) United States Patent
Wu et al.

(10) Patent No.: US 8,005,138 B2
(45) Date of Patent: Aug. 23, 2011

(54) SEAMLESS SWITCHING OF SCALABLE VIDEO BITSTREAMS

(75) Inventors: Feng Wu, Beijing (CN); Shipeng Li, Redmond, WA (US); Xiaoyan Sun, Beijing (CN); Ya-Qin Zhang, West Windsor, NJ (US)

(73) Assignee: Microsoft Corporation, Redmond, WA (US)

( * ) Notice: Subject to any disclaimer, the term of this patent is extended or adjusted under 35 U.S.C. 154(b) by 1603 days.

(21) Appl. No.: 11/280,095

(22) Filed: Nov. 16, 2005

(65) Prior Publication Data

US 2006/0067401 A1 Mar. 30, 2006

Related U.S. Application Data (63) Continuation of application No. 10/186,298, filed on Jun. 27, 2002, now Pat. No. 6,996,173.

(60) Provisional application No. 60/351,891, filed on Jan. 25, 2002.

(51) Int. Cl.
*H04N 7/12* (2006.01)
*H04B 1/66* (2006.01)
(52) U.S. Cl. .......... 375/240.01; 375/240.13; 375/240.14
(58) Field of Classification Search ................ 375/240.1
See application file for complete search history.

(56) References Cited

U.S. PATENT DOCUMENTS

| | | | |
|---|---|---|---|
| 6,208,691 B1 * | 3/2001 | Balakrishnan et al. | .. 375/240.12 |
| 6,292,512 B1 | 9/2001 | Radha et al. | |
| 6,480,541 B1 | 11/2002 | Girod et al. | |
| 6,700,933 B1 | 3/2004 | Wu et al. | |
| 6,795,501 B1 | 9/2004 | Zhu | |
| 2002/0064177 A1 * | 5/2002 | Bertram et al. | ............... 370/458 |
| 2002/0071485 A1 * | 6/2002 | Caglar et al. | ............. 375/240.01 |
| 2002/0118755 A1 | 8/2002 | Karczewicz et al. | |
| 2003/0067872 A1 | 4/2003 | Harrell | |
| 2003/0138042 A1 | 7/2003 | Chen et al. | |
| 2003/0138142 A1 | 7/2003 | Hung | |
| 2003/0206659 A1 | 11/2003 | Hamanaka | |
| 2004/0157555 A1 * | 8/2004 | Richenstein et al. | ........... 455/39 |
| 2004/0198237 A1 * | 10/2004 | Abutaleb et al. | ................ 455/78 |
| 2005/0002458 A1 | 1/2005 | Bruls | |
| 2005/0135477 A1 | 6/2005 | Zhang et al. | |

(Continued)

FOREIGN PATENT DOCUMENTS

WO   WO0062552   10/2000

OTHER PUBLICATIONS

Karczezewicz et al, "A Proposal for SP-frames", ITU Telecommunications Standardization Sector, Study Group 16, Question 6, Document VCEG-L27, Jan. 9, 2001, pp. 1-9. Eibsee, Germany.

(Continued)

*Primary Examiner* — Dac Ha
*Assistant Examiner* — Erin File
(74) *Attorney, Agent, or Firm* — Lee & Hayes, PLLC (57) ABSTRACT

A seamless bitstream switching schema is presented. The schema takes advantage of both the high coding efficiency of non-scalable bitstreams and the flexibility of scalable bitstreams. Small bandwidth fluctuations are accommodated by the scalability of the bitstreams, while large bandwidth fluctuations are tolerated by switching among scalable bitstreams. This seamless bitstream switching schema significantly improves the efficiency of scalable video coding over a broad range of bit rates.

20 Claims, 8 Drawing Sheets

U.S. PATENT DOCUMENTS

2008/0215777 A1* 9/2008 Richenstein et al. ............ 710/69

OTHER PUBLICATIONS

Kurceren, "Improved SP-frame Encoding", ITU Telecommunications Standarization Sector, Study Goup 16, Question 6, Document VCEG-M73, Apr. 2, 2001, pp. 1-5, Austin, USA.

Sun et al, "Efficient and flexible drift-free video bitstream switching at predictive frames", Multimedia and Expo, 2002. ICME 02 Proceedings. 2002 IEEE International Conference on Lausanne, Switzerland, Aug. 26-29, 2002, Piscataway, NJ, USA, IEEE, SU. vol. 1, Aug. 26, 2002, pp. 541-544.

Sun at al, "Improved SP Coding Technique", Joint Video Team (JVT) of ISO/IEC MPEG & ITU-T VCEG (ISO/IEC JTC1/SC29/WG11 and ITU-T SG16 Q6), Document JVT-B097, Jan. 29, 2002, pp. 1-10, Geneva, Switzerland.

Sun et al., "Seamless Switching of Scalable Video Bitstreams for Efficient Streaming" IEEE 2002, pp. 385-388.

Girod et al., "Internet Video Streaming" Telecommunications Laboratory, 1998, 10 pages.

"Working Draft No. 2, Revision 0", Joint Video Team (JVT) of ISO/IEC MPEG and ITU-T VCEG, Pattaya, Thailand, Dec. 3-7, 2001, pp. 1-105.

Kurcerin, et al., "SP-frame demonstrations", Joint Video Team (JVT of ISO/IEC MPEG & ITU-T VCEG (ISO/IECJTC1/SC29/WG11 and ITU-T SG16 Q6, Sep. 21, 2001, XP030003292.

Karczewicz, et at., "A Proposal for SP-frames", ITU Telecommunications Standardization Sector, Document VCEG-127, Jan. 9, 2001, 9 pages.

Wu, et al., "A Framework for Efficient Progressive Fine Granularity Scalable Video Coding", IIEE Transactions, vol. 11. No. 3, Mar. 2001, pp. 332-344.

Notice of Rejection from the Japanese Patent Office for Application No. 2003-018057, mailed on May 1, 2009, 6 pgs.

* cited by examiner

SEAMLESS SWITCHING OF SCALABLE VIDEO BITSTREAMS

RELATED PATENT APPLICATIONS

This continuation application claims priority to U.S. patent application Ser. No. 10/186,298 now U.S. Pat. No. 6,996,173 to Wu et al., filed Jun. 27, 2002, and entitled "Seamless Switching Of Scalable Video Bitstreams," which in turn claims priority to U.S. Provisional Patent Application No. 60/351,891, filed Jan. 25, 2002.

TECHNICAL FIELD

This invention relates to data bitstreams, and more particularly to methods and apparatuses for switching between different bitstreams.

BACKGROUND

With steady growth of access bandwidth, more and more Internet applications start to use streaming audio and video contents. Since the current Internet is inherently a heterogeneous and dynamical best-effort network, channel bandwidth usually fluctuates in a wide range from bit rate below 64 kbps to well above 1 Mbps. This brings great challenges to video coding and streaming technologies in providing a smooth playback experience and best available video quality to the users. To deal with the network bandwidth variations, two main approaches, namely, switching among multiple non-scalable bitstreams and streaming with a single scalable bitstream, have been extensively investigated in recent years.

In the first approach, a video sequence is compressed into several non-scalable bitstreams at different bit rates. Some special frames, known as key frames, are either compressed without prediction or coded with an extra switching bitstream. Key frames provide access points to switch among these bitstreams to fit in the available bandwidth. One advantage of this method is the high coding efficiency with non-scalable bitstreams. However, due to limitation in both the number of bitstreams and switching points, this method only provides coarse and sluggish capability in adapting to channel bandwidth variations.

In the second approach, a video sequence is compressed into a single scalable bitstream, which can be truncated flexibly to adapt to bandwidth variations. Among numerous scalable coding techniques, MPEG-4 Fine Granularity Scalable (FGS) coding has become prominent due to its fine-grain scalability. Since the enhancement bitstream can be truncated arbitrarily in any frame, FGS provides a remarkable capability in readily and precisely adapting to channel bandwidth variations. However, low coding efficiency is the vital disadvantage that prevents FGS from being widely deployed in video streaming applications. Progressive Fine Granularity Scalable (PFGS) coding scheme is a significant improvement over FGS by introducing two prediction loops with different quality references. On the other hand, since only one high quality reference is used in enhancement layer coding, most coding efficiency gain appears within a certain bit rate range around the high quality reference. Generally, with today's technologies, there is still a coding efficiency loss compared with the non-scalable case at fixed bit rates.

Hence, there is a need for improved method and apparatuses for use in switching bitstreams.

SUMMARY

A method is provided for switching between a first bitstream and a second bitstream, wherein the second bitstream provides a higher data rate than the first bitstream. The method includes identifying a switching up period associated with the first and second bitstreams. The method also includes establishing a third bitstream during the switching up period, the third bitstream being configured to carry additional data associated with a switch up from the first bitstream to the second bitstream. The method further includes switching up from the first bitstream to the second bitstream during the switching up period. The method may also support switching down.

An apparatus that is suitable for encoding a first bitstream and a second bitstream, wherein the second bitstream provides a higher data rate than the first bitstream is also provided. Here, the apparatus includes an interface that is configurable to selectively output the first and second bitstreams. The apparatus also includes logic that is configured to selectively encode a plurality of frames of a video sequence within the first bitstream as first encoded data that is at least partially transmittable by the interface in a base layer portion of the first bitstream and the plurality of frames of the video sequence within the second bitstream as second encoded data that is at least partially transmittable by the interface in a base layer portion of the second bitstream. The logic also establishes a plurality of temporally spaced switching up periods associated with the first and second bitstreams, during which, the logic causes the interface to output a third bitstream that is configured to carry additional data associated with a switch up from the first bitstream to the second bitstream. The apparatus may also support switching down.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

In accordance with certain aspects of the present invention, methods and apparatuses are provided according to a seamless switching scheme. The seamless switching scheme is for scalable video bitstreams, and takes advantage of both the high coding efficiency of non-scalable bitstreams and the flexibility of scalable bitstreams. Small bandwidth fluctuations are accommodated by the scalability of the bitstreams, while large bandwidth fluctuations are tolerated by switching among scalable bitstreams. The flexible and effective scheme for seamless switching among scalable bitstreams significantly improves the efficiency of scalable video coding over a broad bit rate range.

By way of example, when the channel bandwidth drops below the effective range of a scalable bitstream operated at higher rates, certain exemplary methods and apparatus are configured to switch at any frame from a current scalable bitstream to one operated at lower rates without sending any overhead bits. Additional bits may be used when switching from a scalable bitstream operated at lower rate to one operated at higher rate. However, an efficient technique is described herein to greatly reduce the amount of overhead bits used.

Experimental results have shown that the exemplary methods and apparatuses significantly outperform both of the convention approaches described in the Background section, e.g., a single scalable bitstream approach and an approach of switching among multiple non-scalable bitstreams.

The next sections introduce some exemplary operating devices, followed by concepts of the seamless switching scheme. An exemplary seamless switching encoder, for example, configured with two MPFGS bitstreams is then described. Some exemplary methods for switching down and switching up are also described below, followed by some experimental results. Additionally, an improved SP coding technique is described Exemplary Operational Environments:

Turning to the drawings, wherein like reference numerals refer to like elements, the invention is illustrated as being implemented in a suitable computing environment. Although not required, the invention will be described in the general context of computer-executable instructions, such as program modules, being executed by a personal computer.

Generally, program modules include routines, programs, objects, components, data structures, etc. that perform particular tasks or implement particular abstract data types. Those skilled in the art will appreciate that the invention may be practiced with other computer system configurations, including hand-held devices, multi-processor systems, microprocessor based or programmable consumer electronics, network PCs, minicomputers, mainframe computers, portable communication devices, and the like.

The invention may also be practiced in distributed computing environments where tasks are performed by remote processing devices that are linked through a communications network. In a distributed computing environment, program modules may be located in both local and remote memory storage devices.

Figure 1:
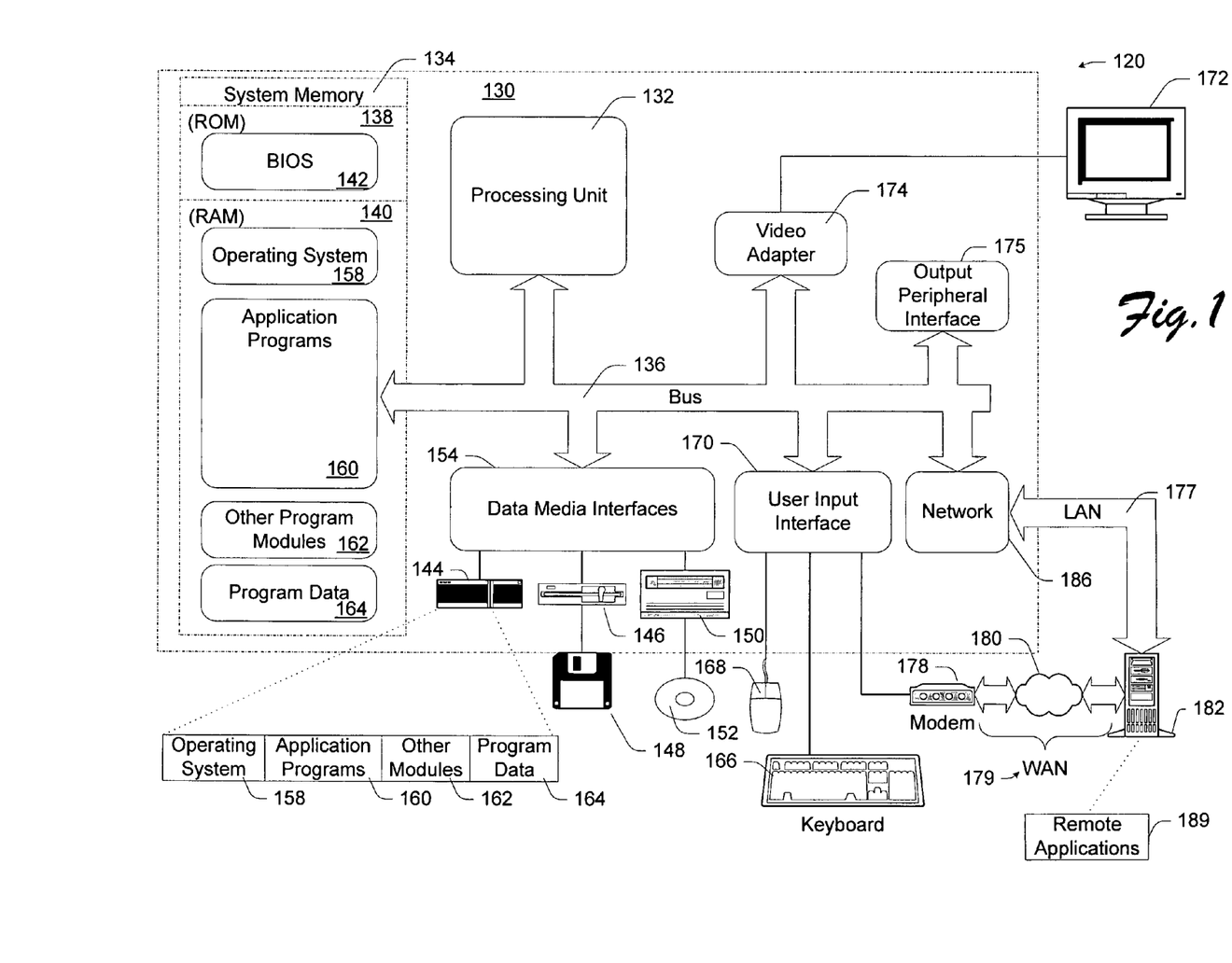
FIG. 1 is a block diagram depicting an exemplary computing environment that is suitable for use with certain implementations of the present invention.

FIG. 1 illustrates an example of a suitable computing environment 120 on which the subsequently described systems, apparatuses and methods may be implemented. Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Exemplary Switching Scheme:

An exemplary seamless switching scheme is provided, which significantly improves the efficiency of scalable video coding over a broad bit rate range by using multiple scalable bitstreams.

Each scalable bitstream has a base layer with a different bit rate and can best adapt to channel bandwidth variation within a certain bit rate range. If the channel bandwidth is out of this range, the scalable bitstream can be seamlessly switched to another with better coding efficiency. Switching from a scalable bitstream operated at lower bit rates to one operated at higher bit rates is referred to herein as switching up and the reversion as switching down.

One problem that is solved is how to flexibly and efficiently switch up and down among scalable bitstreams. There are different requirements for switching up and switching down, respectively. When channel bandwidth somehow drops, for example, the server has to rapidly switch from high bit rate bitstream to low bit rate bitstream to reduce packet loss ratio and maintain smooth video playback.

In accordance with certain aspects of the present invention, the techniques for switching down enable the scalable bitstreams to be switched down at any frame, and reduce/eliminate the use of overhead bits during switching down since the overhead bits tend to increase network traffic and therefore may further deteriorate network conditions.

When channel bandwidth increases, a delay is usually needed for the server to make a reliable decision for switching up. Moreover, in such as situation, improved/improving network conditions allow for additional bits to be transmitted. Thus, in accordance with certain exemplary implementations, the switching up scheme attaches an extra bitstream in some frames to support switching up. In order to avoid drifting errors, the extra bitstream can be formed by losslessly compressing the mismatches between the reconstructed frames with different bitstreams, which will add significant overhead to these frames. In accordance with still other implementations, another method, herein referred to as switching frame (SF), is exemplary to substantially reduce the overhead bits associated with switching up.

Figure 2:
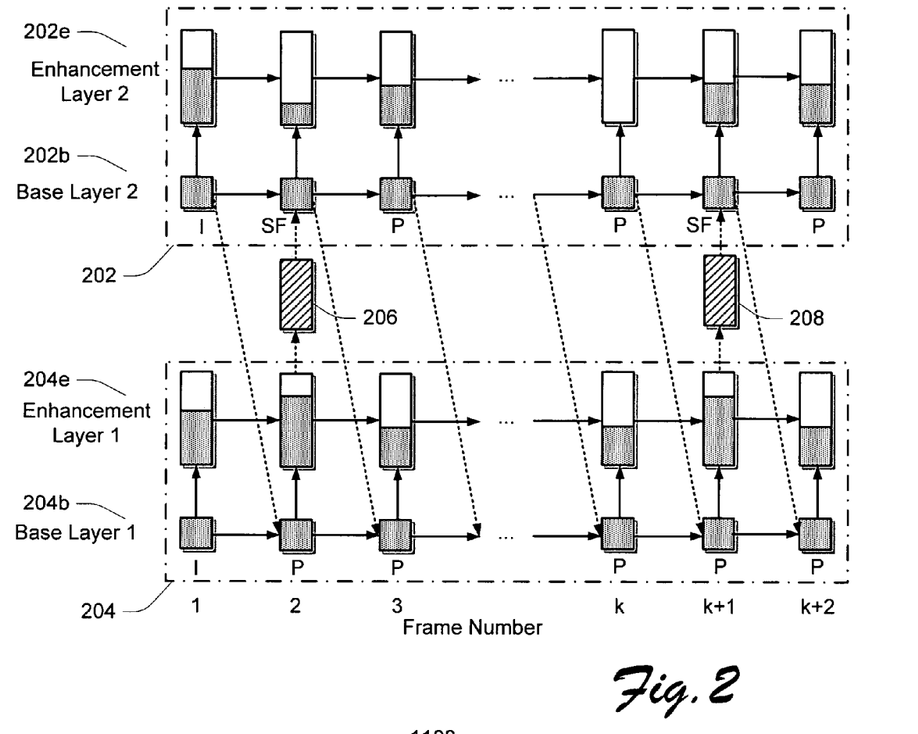
FIG. 2 is a diagram illustratively depicting switching up and switching down between scalable bitstreams, in accordance with certain exemplary implementations of the present invention.

Reference is now made to FIG. 2, which illustratively depicts certain aspects of an exemplary seamless switching scheme 200 using two scalable bitstreams, namely bitstream 202 and bitstream 204. Bitstream 202 includes a base layer 202b and an enhanced layer 202e. Similarly, bitstream 204 includes a base layer 204b and an enhanced layer 204e. Base layer 202b, in this example, has a higher bit rate than base layer 204b.

An important part of the exemplary seamless switching scheme is to selectively switch up and down between base layers 202b/204b without causing drifting and/or other like errors. In general, drifting errors caused, for example, by bitstream truncations, packet losses, transmitted errors, etc., at an enhancement layer, can be recovered automatically and gracefully. This is an important feature provided by fine granularity scalable video coding. Therefore, if the exemplary scheme can successfully switch up and down between the base layers of multiple scalable bitstreams, then whole scalable bitstreams also achieve such operations.

When a server is serving client(s) with one scalable bitstream, the base layer of the bitstream is transmitted to the client. However, the enhancement layer bitstream is usually transmitted partially dependent on the available channel bandwidth. The shaded regions shown in the enhancement layers 202e and 204e indicate the part of their respective bitstream that has been sent by the server. When channel bandwidth somehow drops below a base layer bit rate of the current scalable bitstream, then the exemplary switching scheme rapidly switches down from high bit rate scalable bitstream 202 to low bit rate scalable bitstream 204 to reduce the packet loss ratio and maintain smooth video playback. Therefore, as illustrated by solid arrows with dashed lines between the two base layers, the exemplary scheme reserves a path in every frame for switching down from one base layer (operated at higher bit rate) to another base layer (operated at lower bit rate), as is the case for base layers 202b and 204b. Since there are no overhead bits needed for switching down, the server can easily complete the switching operation by directly transmitting subsequent frames from the scalable bitstream with lower bit rate base layer, for example, base layer 204b.

The exemplary scheme deploys some special points (e.g., associated with 206 and 208) for switching up, such as illustrated the $2^{nd}$ and $(k+1)^{th}$ frames in FIG. 2. Normally the switching up happens when the available channel bandwidth increases enough to allow for use of the higher base layer bit rate. It is reasonable to assume that the current network condition allows transmitting additional bitstream for switching up. Therefore, an extra bitstream, as represented by the rectangular boxes 206 and 208 with slant stripes in FIG. 2, is utilized at such (special) switching points/periods. Furthermore, in order to effectively reduce the overhead bits for switching up, the frames at the higher bit rate base layer (e.g., 202b) are encoded as SF instead of normal P frame at the switching points.

An Exemplary Switching Scheme Using MPFGS Encoders:

In this example, either MPEG-4 FGS or PFGS coding is considered with regard to the switching scheme. This is not meant as a limitation to be placed on the exemplary methods and apparatuses described herein. Those skilled in the art will recognize that the switching scheme is clearly adaptable to these and other video formats, standards, coding techniques, as well as various implementations.

For better coding efficiency and/or other reasons, the macroblock-based PFGS (MPFGS) has been chosen as the basic scalable video codec for this example. The MPFGS codec compresses a video sequence into two bitstreams. In each frame, the base layer bitstream is first generated by traditional non-scalable coding technique, and then the residue between original/predicted DCT coefficients and dequantized DCT coefficients of the base layer forms the enhancement layer bitstream with bit-plane coding techniques. The bit rate of the base layer is the lower bound of the channel bandwidth covered by this scalable bitstream. The enhancement layer bitstream provides fine-grain scalability to adapt to channel bandwidth variations.

Figure 3:
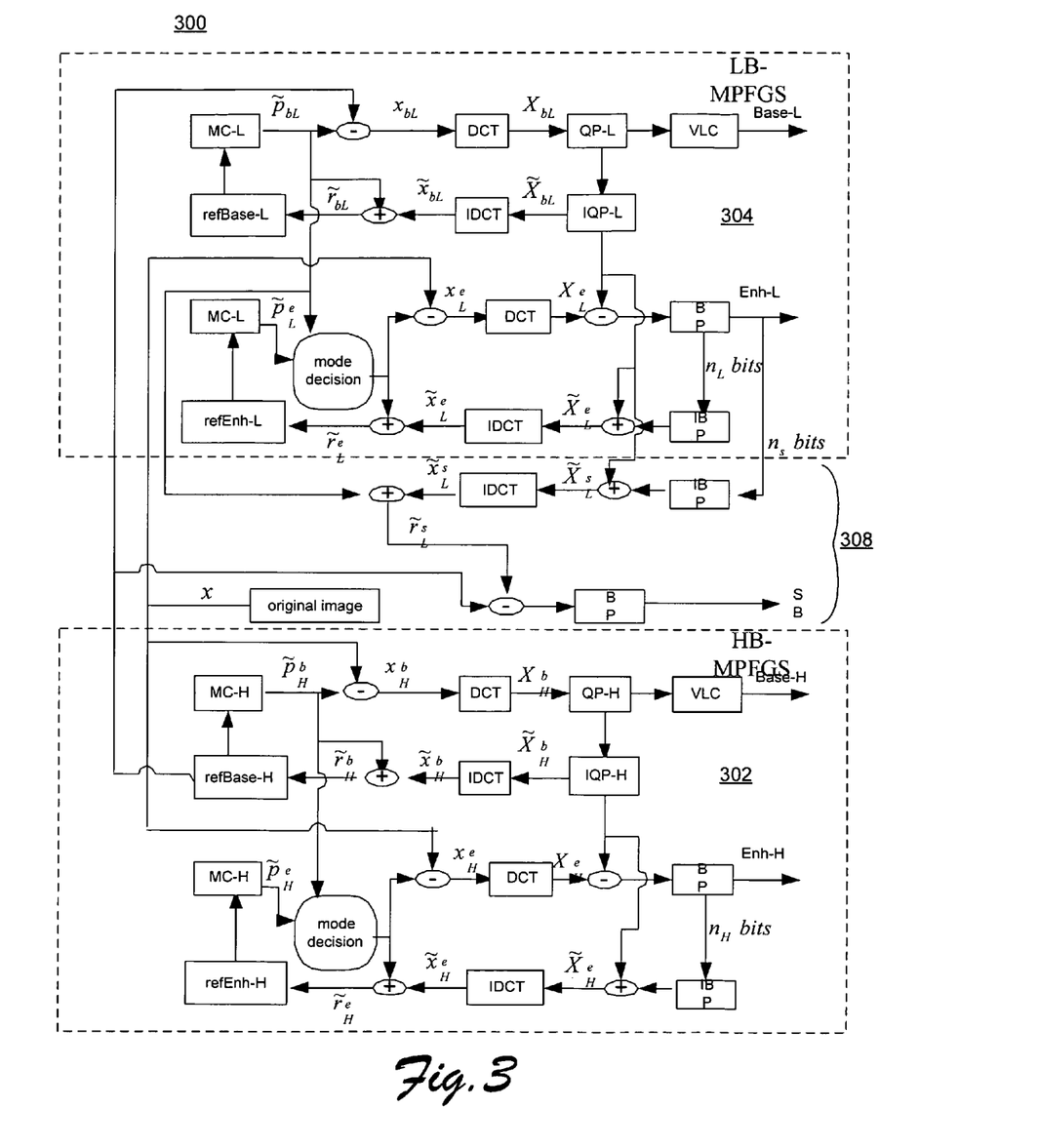
FIG. 3 is a block diagram depicting an encoding framework, in accordance with certain exemplary implementations of the present invention.

An exemplary arrangement 300 for encoding two scalable bitstreams suitable for use with the switching scheme is illustrated in FIG. 3. Note that motion estimation modules are omitted for simplicity. As shown, there are two MPFGS encoders 302 and 304, e.g., as outlined by the dashed boxes. MPFGS encoders 304 is denoted as LB-MPFGS since it generates a scalable bitstream with a lower bit rate base layer 204b, whereas MPFGS encoders 302 is denoted as HB-MPFGS for higher bit rate base layer 202b, accordingly. Portion 308, illustrated between the two MPFGS encoders, is configured to generate an extra bitstream for switching up, for example, as described above.

For convenience in this description, lowercase letters denote an image in pixel domain, and corresponding uppercase letters denote an image in DCT domain. The subscript "b" and "e" indicate the base layer and the enhancement layer, respectively. A tilde "~" denotes reconstructed image or DCT coefficients. The symbols "-H" and "-L" are used to distinguish the modules in HB-MPFGS and LB-MPFGS, respectively.

To ensure that the MPFGS bitstreams are able to be seamlessly switched from one to the other, the base layer bitstreams of these two MPFGS encoders are actually not generated independently. Firstly, motion vectors are estimated in HB-MPFGS and are applied to both HB-MPFGS and LB-MPFGS. Secondly, the video frames to be encoded for the base layer of LB-MPFGS are the reconstructed base layer frames from HB-MPFGS instead of the original video frames.

The original video is first input to HB-MPFGS. Since the motion vectors estimated will be used for both MPFGS encoders, original video frames are used as reference for estimating integer motion vectors, whereas fractional parts of motion vectors are still estimated by referencing the reconstructed base layer of HB-MPFGS to maintain the coding efficiency. There are two references in each MPFGS codec. The low quality reference $\tilde{r}_{bH}$ stored in refBase-H frame buffer is reconstructed from the base layer, whereas the high quality reference $\tilde{r}_{eH}$ stored in refEnh-H frame buffer is reconstructed from both the base layer and the enhancement layer. The base layer only uses low quality reference for prediction and reconstruction, while the enhancement layer can select either the low quality reference or the high quality reference, which is decided by mode decision algorithm. The base layer bitstream and the enhancement layer bitstream are generated using MPEG-4 non-scalable coding and bit plane coding, respectively.

The LB-MPFGS obtains the motion vectors directly from HB-MPFGS without motion estimation. Normally the bit rate of the base layer in HB-MPFGS is much higher than that in LB-MPFGS. To make seamless switching from HB-MPFGS bitstream to LB-MPFGS bitstream possible, the reconstructed high quality base layer from HB-MPFGS instead of the original video is input to the LB-MPFGS base layer encoder. In other words, the predicted error $x_{bL}$ encoded at LB-MPFGS base layer is the difference between the reconstructed HB-MPFGS base layer $\tilde{r}_{bH}$ and the prediction $\tilde{p}_{bL}$. This is similar to transcoding bitstreams from high bit rate to low bit rate. On the other hand, the predicted error $x_{eL}$ is still calculated from the original video in order to maintain the coding efficiency of the enhancement layer in LB-MPFGS.

Switching Down Among Scalable Bitsreams:

One exemplary technique for switching down is similar to transcoding bitstreams from high bit rate to low bit rate. Normally the bit rate of the base layer in HB-MPFGS is much higher than that in LB-MPFGS. The reconstructed high quality base layer from HB-MPFGS instead of the original video is input to the LB-MPFGS base layer encoder. Thus, the signal encoded at the LB-MPFGS base layer is the difference between the reconstructed HB-MPFGS base layer and the temporal prediction. This is an important feature for achieving switching down in any frame without any overhead bits.

When the HB-MPFGS bitstream is being transmitted to the client, the reconstructed reference $\tilde{r}_{bH}$, which is the image to be encoded at the base layer of LB-MPFGS, is very useful for switching down. When the network bandwidth somehow drops below the bit rate of the HB-MPFGS base layer, the HB-MPFGS bitstream has to be promptly switched to the LB-MPFGS bitstream.

One issue is how to precisely recover the reconstructed image $\tilde{r}_{bL}$ to avoid drifting errors. The exemplary scheme presented herein preferably does not transmit an extra bitstream since it is likely that the network can hardly tolerate more overhead bits in such situations. Instead, according to certain features of the scheme, a calculation $\tilde{r}_{bL}$ is made directly from $\tilde{r}_{bH}$, provided that the low quality prediction $\tilde{p}_{bL}$ and quantization parameters of the LB-MPFGS base layer are available.

The quantization parameters of the LB-MPFGS base layer can be readily encoded into HB-MPFGS bitstream. If the quantization parameters are only adjusted at frame level, only five extra bits, for example, may be necessary for each frame. Even if the quantization parameters are adjusted at macroblock level, the number of overhead bits is still relatively small in HB-MPFGS base layer bitstream.

Figure 4:
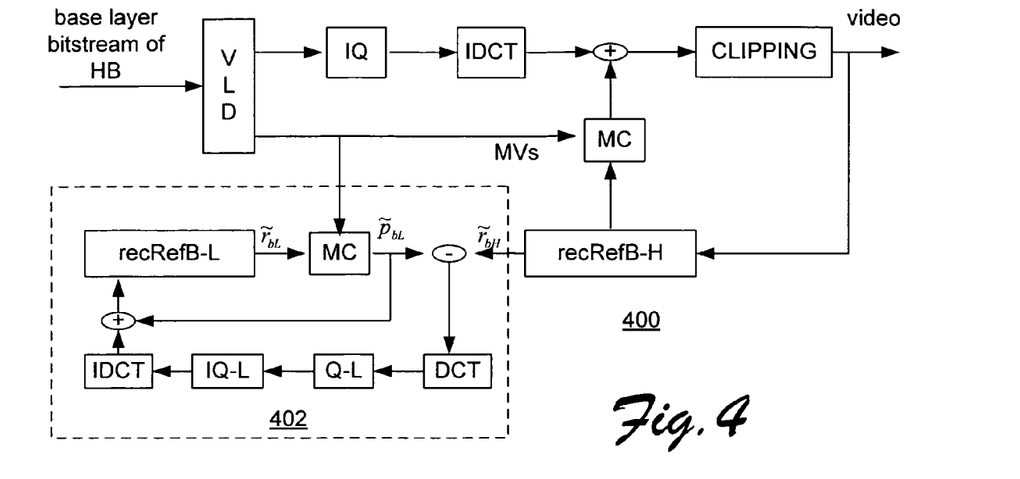
FIG. 4 is a block diagram depicting base layer decoder, in accordance with certain exemplary implementations of the present invention

Reference is made to FIG. 4, which is a block diagram depicting an exemplary base layer decoder 400, in this case, an HB-MPFGS decoder. The low quality prediction $\tilde{p}_{bL}$ is constantly computed by the HB-MPFGS base layer decoder as shown illustrated by the modules in lox 402. This would increase the complexity of HB-MPFGS decoder, but it would not incur any new overhead bits.

When scalable bitstream is just switched up to HB-MPFGS, the prediction $\tilde{p}_{bL}$ is available in LB-MPFGS. After the next frame is decoded in HB-MPFGS, the reconstructed reference $\tilde{r}_{bH}$ is also available. Since the quantization parameters of LB-MPFGS are encoded in the HB-MPFGS base layer bitstream, the reconstructed reference $\tilde{r}_{bL}$ can be calculated as illustrated in FIG. 4. Furthermore, since the same motion vectors are used at both MPFGS decoders, the HB-MPFGS can readily get the next prediction $\tilde{p}_{bL}$ after motion compensation.

Hence, the exemplary scheme can switch down in any frame since the prediction $\tilde{p}_{bL}$ and the quantization parameters of the LB-MPFGS base layer are always available in HB-MPFGS. As shown, one advantage of this scheme is that no extra overhead bits are needed when switching down from HB-MPFGS to LB-MPFGS bitstreams.

Switching Up Among Scalable Bitstreams:

The exemplary scheme switches up for one MPFGS bitstream to the other by attaching an extra bitstream in some frames. Since the extra switching bitstream is usually generated with a lossless method, this would cause huge overhead bits in these frames. Therefore, the SF technique can be used to greatly reduce the overhead bits for switching up.

Figure 5:
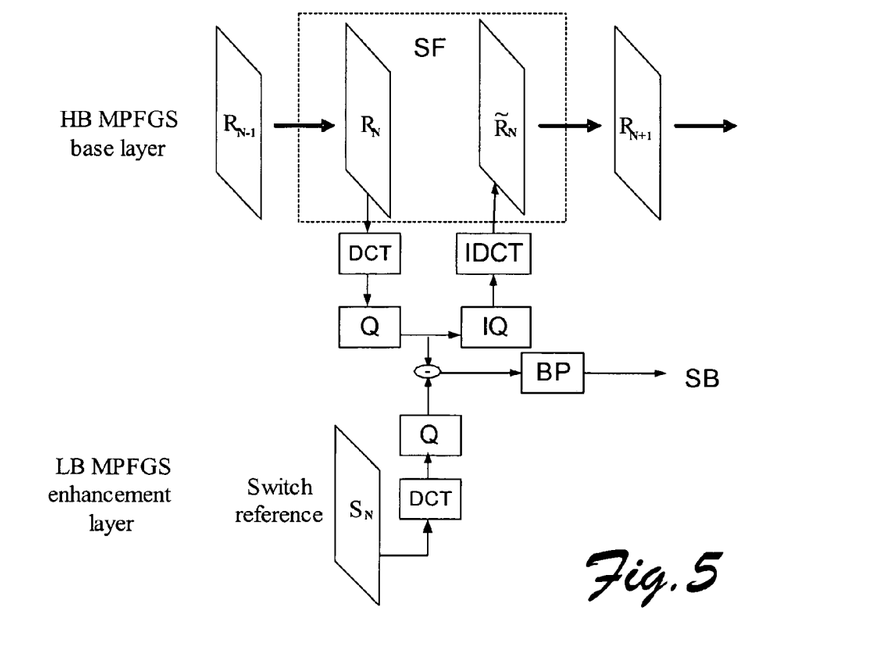
FIG. 5 is a diagram illustratively depicting switching frame coding techniques, in accordance with certain exemplary implementations of the present invention.

With reference to the illustrative diagram in FIG. 5, assume that the $N^{th}$ frame is one access (special) point for switching up. Normally the switching up only happens when the available channel bandwidth is high enough to cover the HB-MPFGS base layer bit rate. Here, $S_N$ is the reconstructed image from the LB-MPFGS enhancement layer at the corresponding bit rate. $R_N$ is the reconstructed image at the HB-MPFGS base layer. For the traditional method, the difference between them is losslessly compressed into the switching bitstream.

In the SF method, both $S_N$ and $R_N$ are first transformed into DCT domain, and then are quantized with the same quantization parameter. The difference between two sets of quantized DCT coefficients is compressed with the bit plane coding technique to form the switching bitstream. In this case, the recovered image by the dequantized $S_N$ plus the difference encoded in the switching bitstream is the dequantized $\tilde{R}_N$. To avoid drifting errors at the HB-MPFGS base layer, the reference for the next frame coding is $\tilde{R}_N$ instead of $R_N$ in the switching frame.

Since the quantization is introduced in the SF method, the overhead bits in the switching bitstream can be greatly reduced by adjusting the quantization parameter. One concern is the effect of the SF method on the coding efficiency of two MPFGS encoders. Firstly, $S_N$ is used for the purposes of switching up. It is not used in the LB-MPFGS coding, thus the quantization of $S_N$ will have no effect on the LB MPFGS coding efficiency. Using $\tilde{R}_N$ as reference will affect the coding efficiency of HB-MPFGS to some extent. However, it is expected that the switching point/period can be inserted with about half a second or about a one second interval in most applications. Other intervals may also be used depending upon the design of the system. Here, it is assumed that this kind of coding efficiency losses is afforded in the HB-MPFGS.

Some Experimental Results:

Five different schemes were tested and compared in terms of both coding efficiency and channel bandwidth adaptation. The different schemes included: (1) a seamless switch with lossless SB, (2) a seamless switch with SF, (3) MPEG-4 FGS, (4) MPFGS, and (5) a switch between non-scalable bitstreams.

For the experiment, a QCIF sequence News and Foreman were used with a 10 Hz encoding frame rate. Only the first frame was encoded as I frame, and the subsequent frames were encoded as P frames. A TM5 rate control method was used in the base layer encoding. For the experiment, the range of motion vectors was limited to ±15.5 pixel with half pixel precision.

In the seamless scheme with or without the SF method, the bit rate of the LB-MPFGS base layer was 32 kbps. The high quality reference was reconstructed at 64 kbps (e.g., the base layer plus a 32 kbps enhancement layer), and channel bandwidth covered by LB-MPFGS was from 32 kbps to 128 kbps. The bit rate of the HB-MPFGS base layer was 80 kbps including the overhead bits for coding quantization parameters of the LB-MPFGS base layer. The high quality reference was reconstructed at 112 kbps. The channel bandwidth range covered by the HB-MPFGS can be from 80 kbps up to lossless rate. However, in this experiment, the upper bound of the HB-MPFGS bit rate was limited to 160 kbps.

Switching between non-scalable bitstreams is extensively used in many commercial streaming video systems. Two non-scalable bitstreams were used in this experiment with the same conditions as in the LB-MPFGS and HB-MPFGS base layers. However, I frames are inserted every ten frames for easy switching between bitstreams since channel bandwidth changes with minimum 1 second interval in this experiment. In the single MPEG-4 FGS and the single MPFGS schemes, the base layer bit rate was same as that in LB-MPFGS. The high quality reference in the single MPFGS bitstream was reconstructed at the bit plane with bit rate over 40 kbps. Thus, most coding efficiency gain was biased toward high bit rates.

Figure 6A:
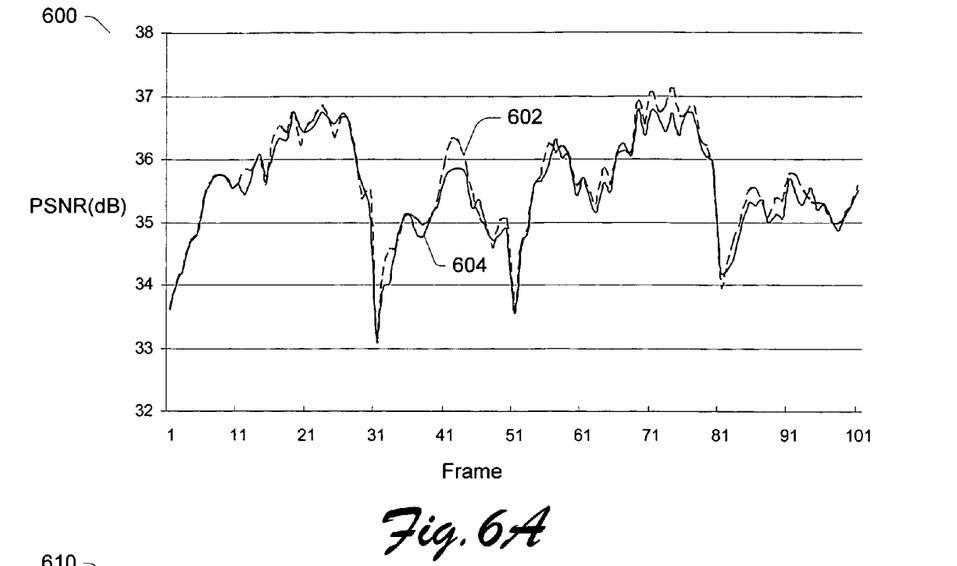
FIGS. 6A-B, 7A-B, and 8A-B are graph depicting some experimental results for methods and apparatuses, in accordance with certain exemplary implementations of the present invention.
Figure 6B:
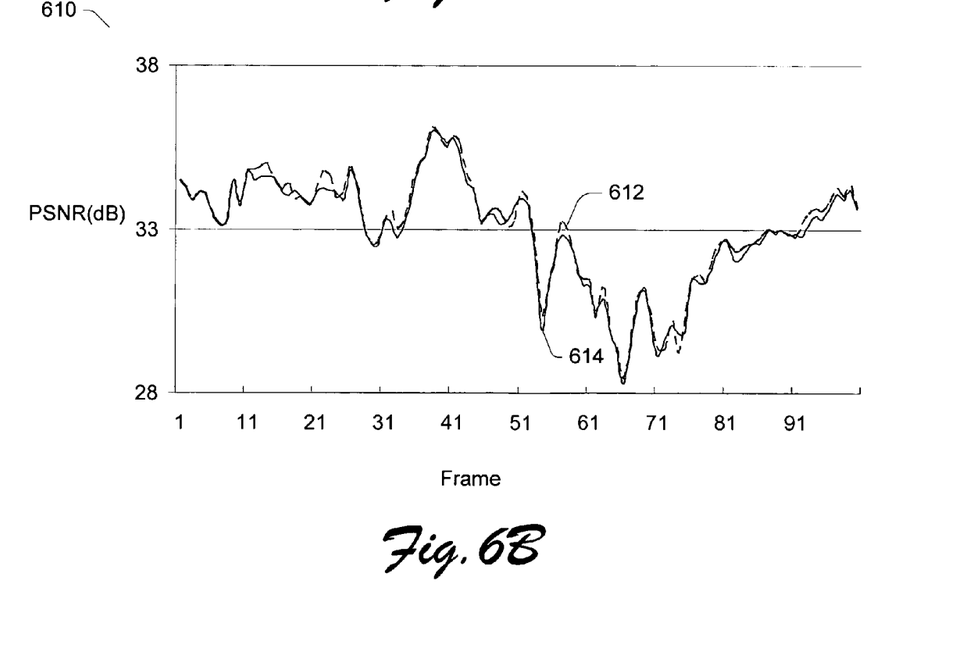

The effect of the SF technique on the coding efficiency of the HB-MPFGS base layer was first evaluated using graphs 600 and 610 depicted in FIGS. 6A and 6B respectively, which shows a plot of the PSNR(dB) for a plurality of frames. Graph 600 is for a News Y QCIF bitstream and graph 610 is for a Foreman Y QCIF bitstream. Included in each plot are two lines. Lines 602 and 612 are dashed lines showing the results without the SF method, and lines 604 and 614 are solid lines showing the results with the SF method. The switching points/periods were inserted every ten frames in the HB MPFGS base layer. The quantization parameter of SF was set to 3 for all sequences.

The results in FIGS. 6A-B show that the average PSNR loss is below 0.1 dB compared with the lossless coding method. However, the average overhead bits in each switching frame are greatly reduced as listed in the table below. Here, only about 20% overhead bits were needed for the SF technique.

| Average bits for each frame in the extra bitstream | | | |
|---|---|---|---|
| News Y QCIF | | Forman Y QCIF | |
| SF | Lossless | SF | Lossless |
| 30,351 bits | 133,090 bits | 31,840 bits | 156,212 bits |

Figure 7A:
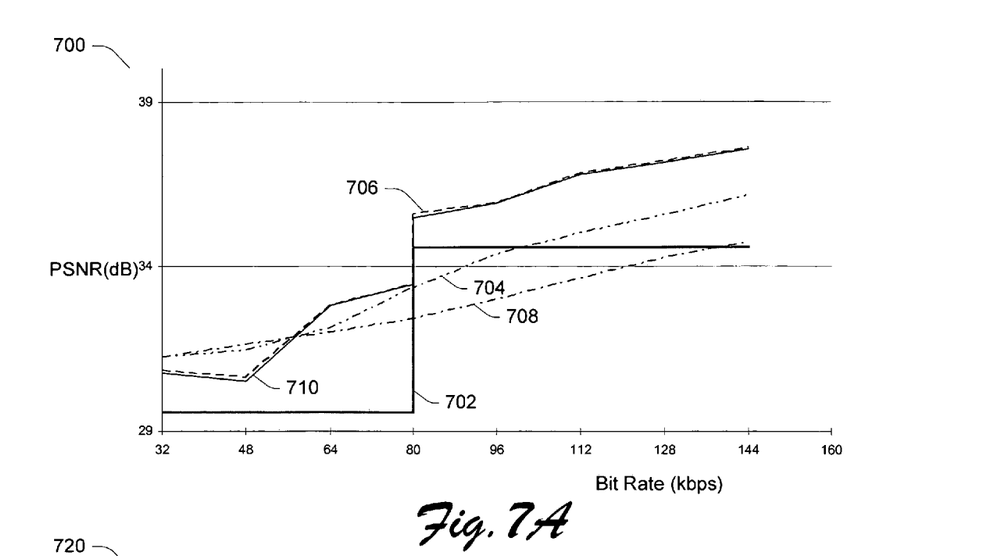
Figure 7B:
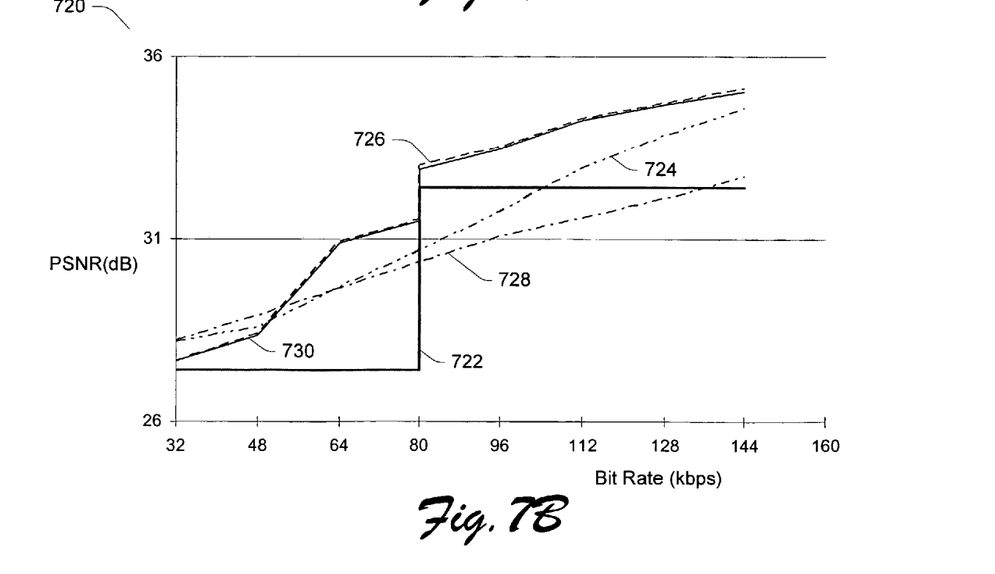

The plots of average PSNR(dB) versus bit rate (kbps) are depicted in graphs 700 and 720 in FIGS. 7A and & 7B, respectively. Graph 700 is for a News Y QCIF bitstream and graph 720 is for a Foreman Y QCIF bitstream. Lines 702 and 722 illustrate the switch. Lines 704 and 724 illustrate the results of MPFGS. Lines 706 and 726 illustrate the results of the exemplary scheme provided above without SF. Lines 708 and 728 illustrate the results of FGS. Lines 710 and 730 illustrate the results of the exemplary scheme provided above with SF.

Switching between non-scalable bitstreams only provides two different quality levels, while other schemes can flexibly and precisely adapt to channel bandwidth and provide smooth visual quality. Compared with the single FGS and MPFGS bitstream schemes, the coding efficiency of the exemplary scheme can be about 2.0 dB higher than MPFGS and about 3.0 dB higher than FGS at higher bit rates. The SF method almost provides the same performance as the lossless coding while greatly reducing the overhead bits for switching up.

A dynamic channel was used to verify the performances of four different coding schemes in terms of bandwidth adaptation. The overhead bits for switching up were excluded in the simulation. In this experiment, the bit rate was periodically switched from 72 kbps to 152 kbps. Each cycle starts at 72 kbps for 1 second and then switches to 152 kbps for 3 seconds.

Figure 8A:
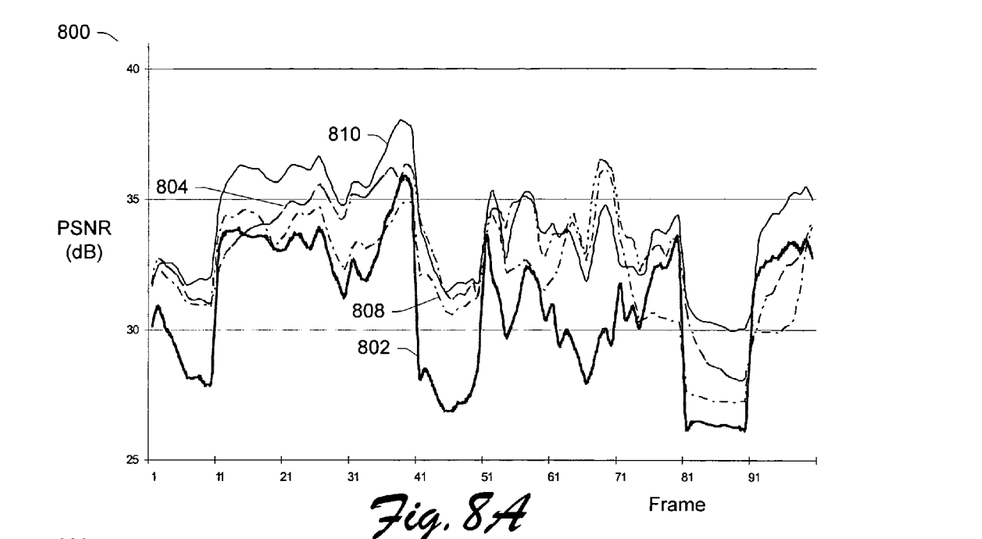
Figure 8B:
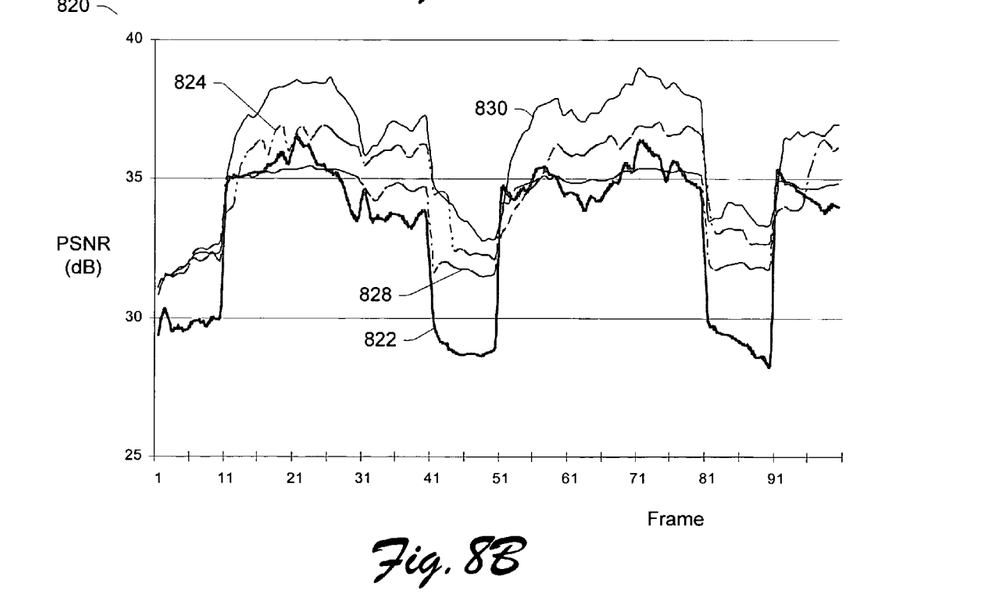

The results are plotted, PSNR(dB) versus frame number, in graphs 800 and 820 in FIGS. 8A and 8B, respectively. Graph 800 is for a News Y QCIF bitstream and graph 820 is for a Foreman Y QCIF bitstream. Lines 802 and 822 illustrate the switch. Lines 804 and 824 illustrate the results of MPFGS. Lines 808 and 828 illustrate the results of FGS. Lines 810 and 830 illustrate the results of the exemplary scheme provided above with SF.

The exemplary scheme switches up 3 times and switches down 2 times in order to adapt channel bandwidth fluctuations. Clearly, the exemplary scheme with the SF technique achieves the best performances among these four schemes at both lower bit rates and higher bit rates.

Improved SP Coding Techniques:

In order to meet the requirements on file storage support, the joint video Team (JVT) (a standards body) has adopted an SP coding technique in the current reference software. Some desired functionalities are provided by the technique, such as bitstream switching, random access and bandwidth adaptation.

Figure 9:
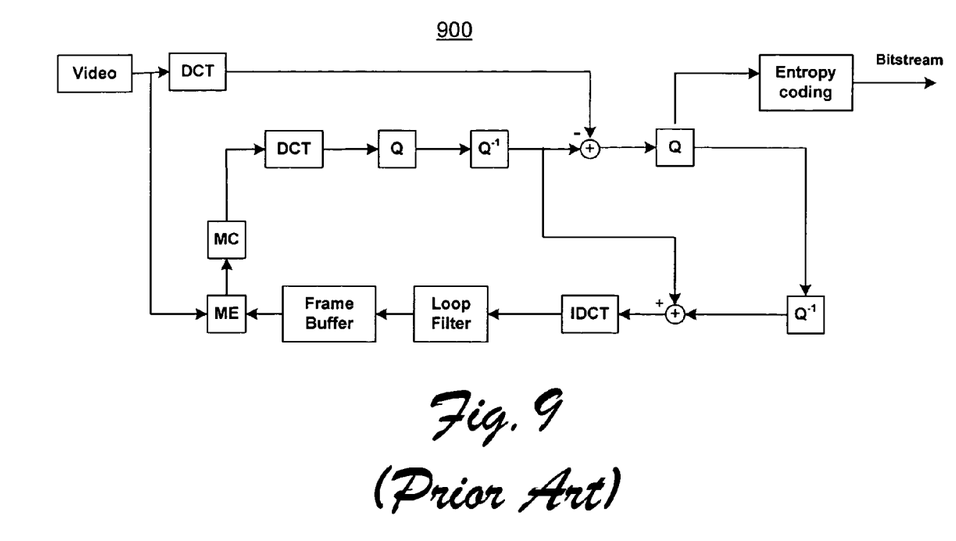
FIG. 9 is a block diagram depicting a conventional SP coding scheme.

FIG. 9 is a block diagram illustrating a conventional SP coding scheme 900 used in the JVT software. The additional DCT transform and quantization operate on the prediction image. Since the current SP scheme at the encoder and decoder is quite different from that for normal P frame, this makes the hardware implementation of JVT codec very complicated.

Figure 10:
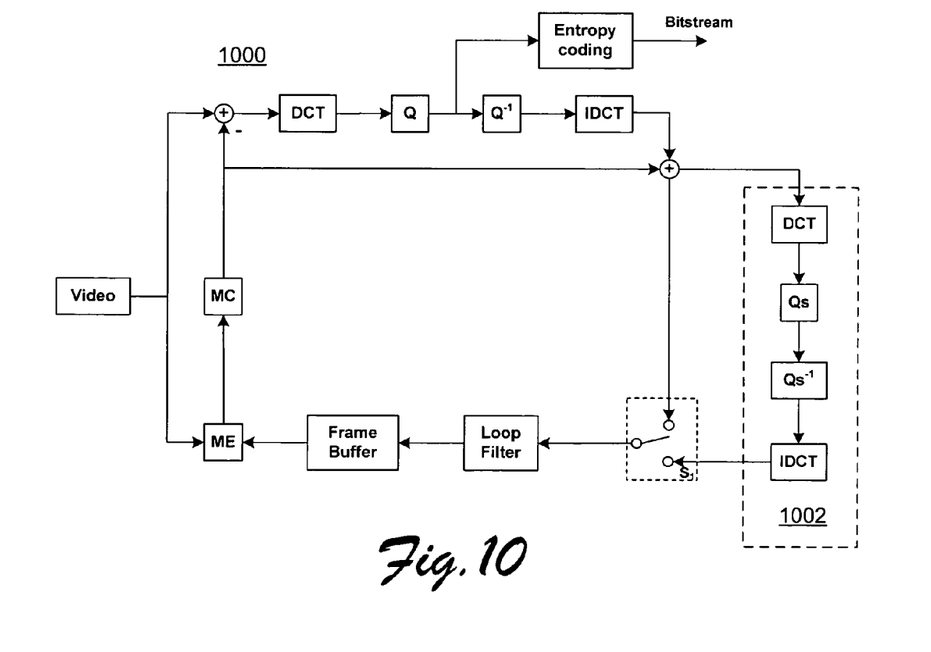
FIG. 10 is a block diagram depicting an enhanced SP coding scheme, in accordance with certain exemplary implementations of the present invention.

FIG. 10 is a block diagram illustrating an exemplary SP coding scheme 1000, in accordance with certain aspects of the present invention. SP coding scheme 1000 provides the same functionalities existing in scheme 900. One difference between the two schemes, however, is the addition of improvement 1002 in which an additional DCT transform and quantization operate on the reconstructed image instead of the prediction image.

In order to switch between bitstreams in the SP frame, the original SP coding scheme compresses the difference between two prediction images into an additional bitstream, whereas the exemplary SP coding scheme compresses the difference between two reconstructed images.

Some further advantages of scheme 1000 are discussed in the following content.

Simplification For Hardware Implementation:

As shown in FIG. 10, the additional modules for the SP coding are shown in improvement 1002. The other part is the same as that in the P frame coding. When the current frame is a SP frame, the reconstructed image is input to the SP modules. After quantization, the generated image is input to the Loop Filter modules and saved in a frame buffer for the next frame coding. The quantization parameter in the module Qs is a unique value at frame level, which is encoded with the same method in scheme 900, for example. It can be different from the parameter used in the module Q. Therefore, for hardware implementation the exemplary scheme 1000 can be made simpler by using the same codec for both P frame and SP frame.

Flexibility for Application Deployment:

Since different parameters can be used in the module Q and Qs, the exemplary scheme 1000 provides more flexibility for applications. Compared with the P frame, the coding efficiency loss in the SP frame is caused by the quantization Qs. By adjusting the parameter in the module Qs, a better trade-off between the number of switching bits and the coding efficiency can be achieved.

Figure 11:
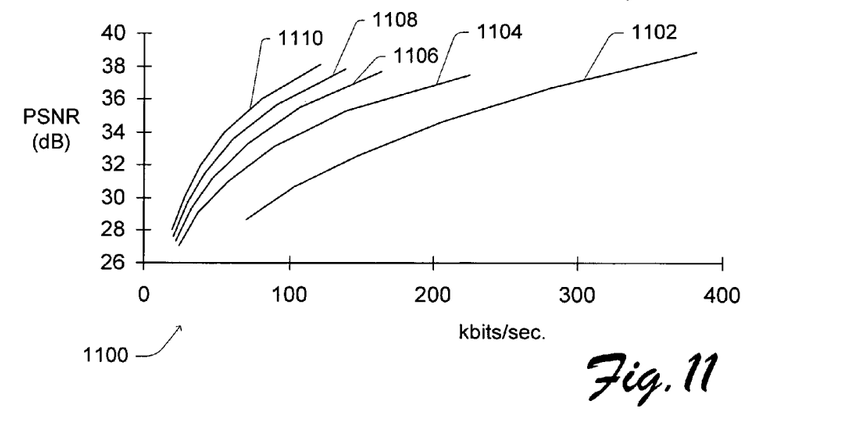
FIG. 11 is a graph depicting some experimental results for methods and apparatuses, in accordance with certain exemplary implementations of the present invention.

An example is shown by graph 1100 in FIG. 11. Here, PSNR(dB) verses kbits/sec is shown, using five lines, with a Foreman Y QCIF bitstream as the source. Each line is based on six points corresponding to the quantization parameters 13, 16, 19, 22, 25 and 28 in the module Q. Except for the INTRA line 1102 and P line 1110, the other lines represent different quantization parameters in the module Qs. Here, line 1104 is for SF-16, line 1106 is for SF-9, and line 1108 is for SF-3. As shown, if the parameter is SF-3 (line 1108), the performance of SP is very close to that of P (line 1110). As illustrated by these results, the exemplary scheme 1000 provides more flexibility.

In the conventional scheme 900, since the quantization operates on the prediction image, any lost information would directly affect the coding efficiency of the current frame. However, in the exemplary scheme 1000, the quantization operates on the reconstructed image. However, the display image can still be reconstructed the same as the P frame. The degraded reference will affect the next frame. The coding efficiency loss may be less than that in the current frame due to motion compensation.

CONCLUSION

A seamless switching scheme for scalable video bitstreams has been described that takes advantage of both the high coding efficiency of non-scalable bitstreams and/or the flexibility of scalable bitstreams. Small bandwidth fluctuations are accommodated by the scalability of the bitstreams, while large bandwidth fluctuations are tolerated by switching between scalable bitstreams. The exemplary scheme can cover an extended bit rate range with significantly improved coding efficiency. Furthermore, no additional bits are needed in the freely switching down with the exemplary technique, and the exemplary SF technique also greatly reduces the overhead bits for switching up. The experimental results show that the exemplary scheme outperforms the method of switching non-salable bitstreams both in coding efficiency and bandwidth adaptation. The coding efficiency of the exemplary scheme is also significantly higher than that of single MPFGS or MPEG-4 FGS bitstream over a wide range of bit rates.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A computer-implemented method executable on a processor for switching between a first bitstream and a second bitstream, wherein the second bitstream provides a higher data rate than the first bitstream, the method comprising:
identifying a switching up period associated with the first and second bitstreams, the first bitstream comprising first encoded data for a plurality of frames within a video sequence, the first encoded data being at least partially transmitted in a base layer portion of the first bitstream;
establishing a third bitstream during the switching up period, the third bitstream being configured to carry additional data associated with a switch up from the first bitstream to the second bitstream, wherein the additional data is based at least on a difference between a first reconstructed image from the first bitstream and a second reconstructed image from the second bitstream; and
switching up from the first bitstream to the second bitstream during the switching up period.

2. The computer-implemented method as recited in claim 1, wherein a portion of the first encoded data is further transmitted in an enhanced layer portion of the first bitstream.

3. The computer-implemented method as recited in claim 2, wherein the portion of the first encoded data transmitted in the enhanced layer portion of the first bitstream includes residue data associated with the first encoded data transmitted in the base layer portion.

4. The computer-implemented method as recited in claim 3, wherein the residue data is based on discrete cosine transform (DCT) coefficients and dequantized DCT coefficients associated with the first encoded data transmitted in the base layer portion.

5. The computer-implemented method as recited in claim 3, wherein the residue data is bit-plane coded.

6. The computer-implemented method as recited in claim 1, the second bitstream comprising second encoded data for the plurality of frames within the video sequence, the second encoded data being at least partially transmitted in a base layer portion of the second bitstream.

7. The computer-implemented method as recited in claim 6, wherein a portion of the second encoded data is further transmitted in an enhanced layer portion of the second bitstream.

8. The computer-implemented method as recited in claim 7, wherein the portion of the second encoded data transmitted in the enhanced layer portion of the second bitstream includes residue data associated with the second encoded data transmitted in the base layer portion.

9. The computer-implemented method as recited in claim 8, wherein the residue data is based on discrete cosine transform (DCT) coefficients and dequantized DCT coefficients associated with the second encoded data transmitted in the base layer portion.

10. The computer-implemented method as recited in claim 8, wherein the residue data is bit-plane coded.

11. An apparatus suitable for switching between a first bitstream and a second bitstream, wherein the second bitstream provides a higher data rate than the first bitstream, the apparatus comprising:
a memory;
one or more processors;
an interface, operable on the one or more processors, configurable to selectively receive the first and second bitstreams; and
logic operatively coupled to the interface and configured to determine a switching up period associated with the first and second bitstreams, cause the interface to support a third bitstream during the switching up period, wherein the third bitstream is configured to carry additional data associated with a switch up from the first bitstream to the second bitstream, and cause the interface to switch up from receiving the first bitstream to receiving the second bitstream as a result of the switch up, the first bitstream comprising first encoded data for a plurality of frames within a video sequence, the first encoded data being at least partially transmitted in a base layer portion of the first bitstream, wherein the additional data carried by the third bitstream is based at least on a compressed difference between a first reconstructed image from the first bitstream and a second reconstructed image from the second bitstream.

12. The computer-implemented method as recited in claim 1, wherein the first reconstructed image and the second reconstructed image are each quantized and transformed into a DCT domain to form at least a part of the additional data.

13. The apparatus as recited in claim 11, wherein a portion of the first encoded data is further received in an enhanced layer portion of the first bitstream.

14. The apparatus as recited in claim 13, wherein the portion of the first encoded data received in the enhanced layer portion of the first bitstream includes residue data associated with the first encoded data received in the base layer portion.

15. An apparatus suitable for encoding a first bitstream and a second bitstream, wherein the second bitstream provides a higher data rate than the first bitstream, the apparatus comprising:
a memory;
one or more processors;
an interface, operable on the one or more processors, configurable to selectively output the first and second bitstreams; and
logic operatively coupled to the interface and configured to selectively encode a plurality of frames of a video sequence within the first bitstream as first encoded data that is at least partially transmittable by the interface in a base layer portion of the first bitstream and the plurality of frames of the video sequence within the second bitstream as second encoded data that is at least partially transmittable by the interface in a base layer portion of the second bitstream, and
wherein the logic establishes a plurality of temporally spaced switching up periods associated with the first and second bitstreams, during which the logic causes the interface to output a third bitstream wherein the third bitstream is configured to carry additional data associated with a switch up from the first bitstream to the second bitstream and based at least on a difference between a first reconstructed image from the first bitstream and a second reconstructed image from the second bitstream.

16. The apparatus as recited in claim 15, wherein a portion of the first encoded data is further output in an enhanced layer portion of the first bitstream.

17. The apparatus as recited in claim 16, wherein the portion of the first encoded data output in the enhanced layer portion of the first bitstream includes residue data associated with the first encoded data received in the base layer portion.

18. The apparatus as recited in claim 17, wherein the residue data is based on discrete cosine transform (DCT) coefficients and dequantized DCT coefficients associated with the first encoded data output in the base layer portion.

19. The apparatus as recited in claim 15, wherein the residue data is bit-plane coded.

20. The apparatus as recited in claim 11, wherein the first reconstructed image and the second reconstructed image are each quantized and transformed into a DCT domain to form at least a part of the additional data.

* * * * *